United States Patent [19]

Ben Lulu

[11] Patent Number: 5,583,495
[45] Date of Patent: Dec. 10, 1996

[54] VEHICLE ALARM SYSTEM

[76] Inventor: Dani Ben Lulu, 27/21 Ort Street, Ashkelon, Israel

[21] Appl. No.: 392,855
[22] PCT Filed: Sep. 1, 1993
[86] PCT No.: PCT/US93/08193
  § 371 Date: Mar. 2, 1995
  § 102(e) Date: Mar. 2, 1995
[87] PCT Pub. No.: WO94/05525
  PCT Pub. Date: Mar. 17, 1994

[30] Foreign Application Priority Data

Sep. 2, 1992 [IL] Israel ........................................ 103024

[51] Int. Cl.$^6$ .................................................. G08G 1/00
[52] U.S. Cl. ........................ 340/904; 340/435; 340/436; 342/70; 367/909; 180/170; 364/461; 364/426.041
[58] Field of Search .................................. 340/904, 903, 340/435, 436; 342/70; 367/909, 112, 107; 180/167, 168, 169, 170; 364/460, 461, 426.04

[56] References Cited

U.S. PATENT DOCUMENTS 4,028,662  6/1977  Young ...................................... 340/904
4,694,296  9/1987  Sasaki et al. ........................... 340/903
5,235,316  8/1993  Qualizza ................................. 340/435

FOREIGN PATENT DOCUMENTS 4024800  1/1992  Japan ..................................... 340/903
2076197  11/1981  United Kingdom ................... 340/435

Primary Examiner—Jeffery Hofsass
Assistant Examiner—Nina Tong
Attorney, Agent, or Firm—Mark M. Friedman

[57] ABSTRACT

A vehicle bind spot detector, comprising ultrasound transmitters and receivers deployed on both sides of a vehicle, for continuously, simultaneously, monitoring for dangerous road situations due to vehicles present in dead area open space in angles $\beta 1$ and $\beta 2$, on left and right sides of the vehicle, which areas are outside of a driver's field of view, hence in the vehicle blind spots. The vehicle blind spot detector includes capability of individualizing the ultrasound signals used in the detection of vehicles in the blind spots, thus preventing interference between blind spot detectors installed in adjacent vehicles.

6 Claims, 3 Drawing Sheets

VEHICLE ALARM SYSTEM

FIELD AND BACKGROUND OF THE INVENTION

The present invention relates to the field of technical vision for objects detection, and, more particularly to systems for providing an alarm when a vehicle is present in the dead zone of driver's view (FIG. 1) at the left or right side of the vehicle, especially when the driver tries to move to one side or the other, as when changing lanes.

SUMMARY OF THE INVENTION

According to the present invention, there is provided an apparatus for the automatic detection of dangerous objects in the left and right sides of vehicle and in its back space comprising: ultrasound transmitters (4) activated by generators (6) with defined angle of radiation emitting ultrasound waves continuously or pulsed or modulated; ultrasound receivers (14) connected to an analog or digital analyzer for determination of intensity, speed of change, Doppler's frequency change and angle of fall of the received signal that depends on road situation; amplifiers (16), signal analyzer (18) includes time and frequency discriminators for speed and distance determination, received returned signal from amplifiers and standard signal from generator, control and signal from amplifiers and standard signal from generator, control and calculation unit with condition inputs like vehicle speed (10) and turn signal (12), commutation unit, alarm or display unit for communication with driver, communication to other vehicle systems that detects dangerous objects presence into the pre-defined area limited by lines of driver's direct view, borders of left and right adjacent lines of traffic and predetermined distance back and provides alarm or signalization to vehicle driver.

BRIEF DESCRIPTION OF THE DRAWINGS

The invention is herein described, by way of example only, with reference to the accompanying drawings, wherein:

FIG. 2 shows functional division of dangerous places on the left and right sides. Distance A is comparable with vehicle length. Distance B is additional length that dangerous object may arrive from.

DESCRIPTION OF THE PREFERRED EMBODIMENTS

Figure 1:
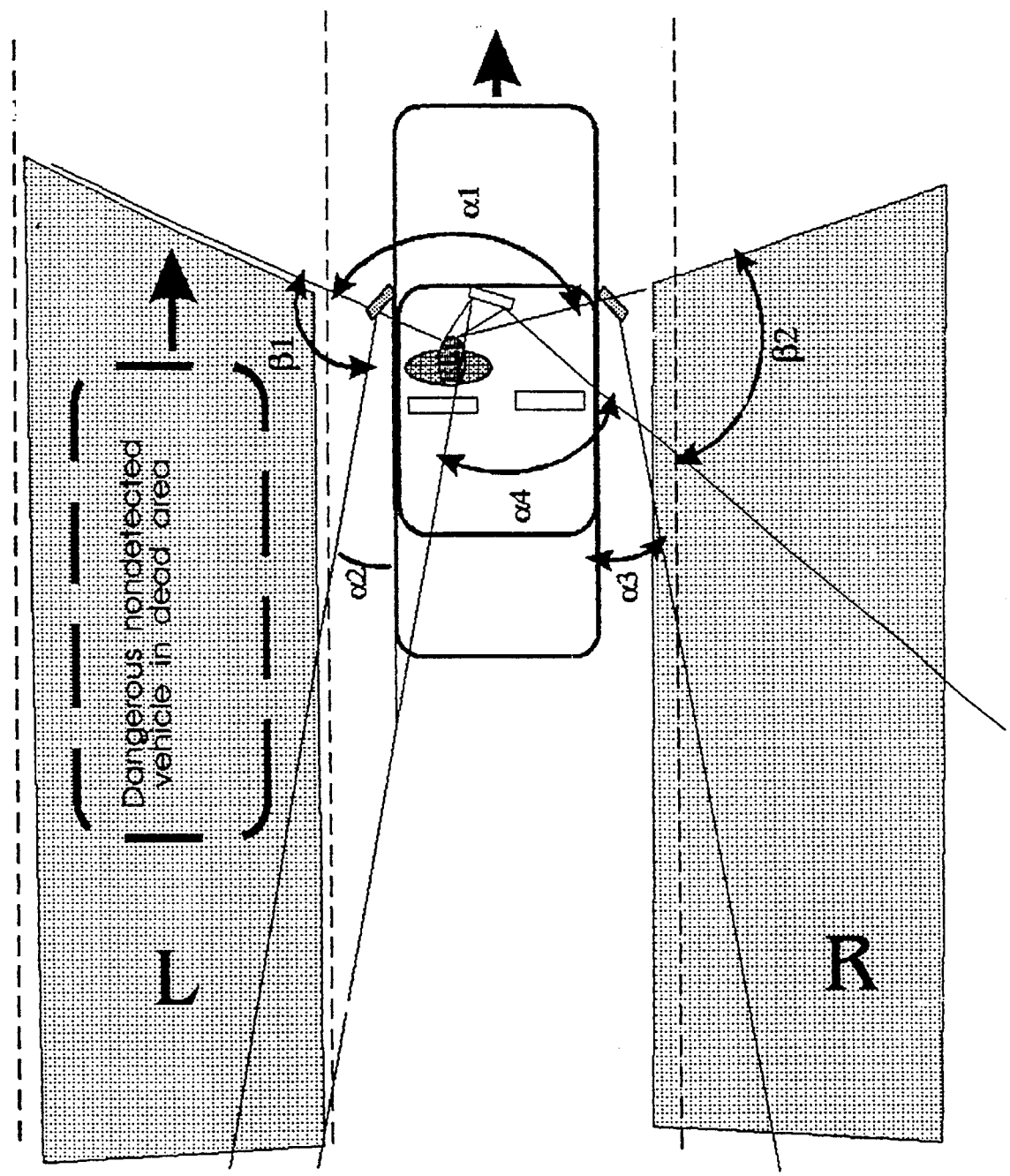
FIG. 1 contains basic drawing of driver's field of view where $\alpha 1$ is a front view, $\alpha 2$—view through left side mirror, $\alpha 3$—view through right side mirror, $\alpha 4$—panorama mirror view, $\beta 1$ and $\beta 2$ angles defining "dead area" of drivers view. R and L are areas where detection of another vehicle is needed. Those areas includes two lines (in the left and right sides) limited by $\alpha 1$ angle lines forward and same distance back from vehicle (about 10–15 meters). Dashed line shows dangerous object may occur in those areas.

FIG. 1 presents the borders of vehicle driver's view, defined by direct angle $\alpha 1$ in addition with back view throw the left side mirror $\alpha 2$, back view through right side mirror $\alpha 3$ and back view through panorama mirror $\alpha 4$. There remains blind spot dead area open space in angle $\beta 1$ in left $\beta 2$ in right side of drawing vehicle. Non detected vehicle may appear in dead area. Danger state occurs when driver tries to move to the left or right path of the road for overcoming preceding low speed vehicle or any object on the left or right. An accident may occur. For prevention of accident driver must have alarm when another vehicle is moving in the dead area or comes near for overcame his own vehicle.

Figure 2:
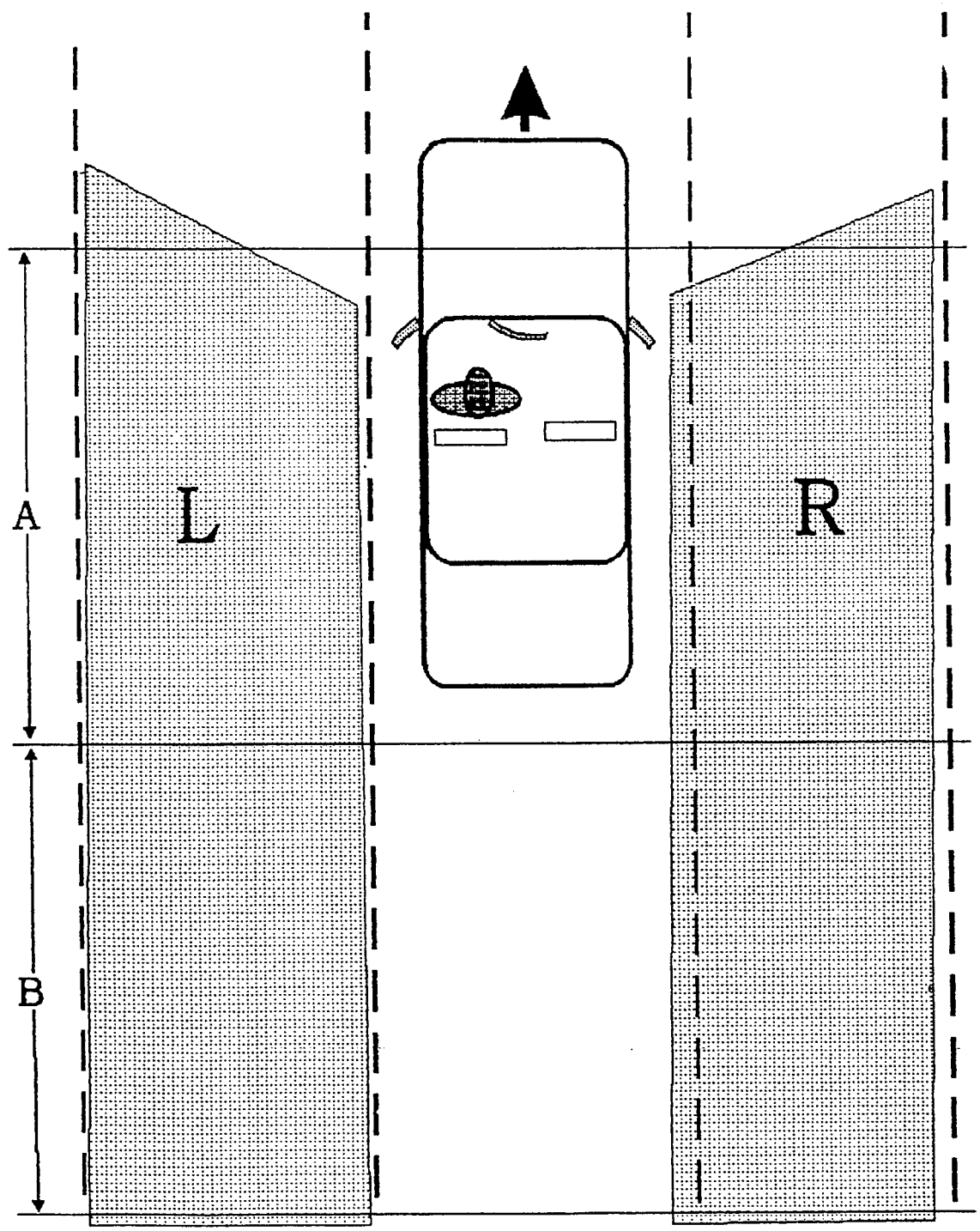
Figure 3:
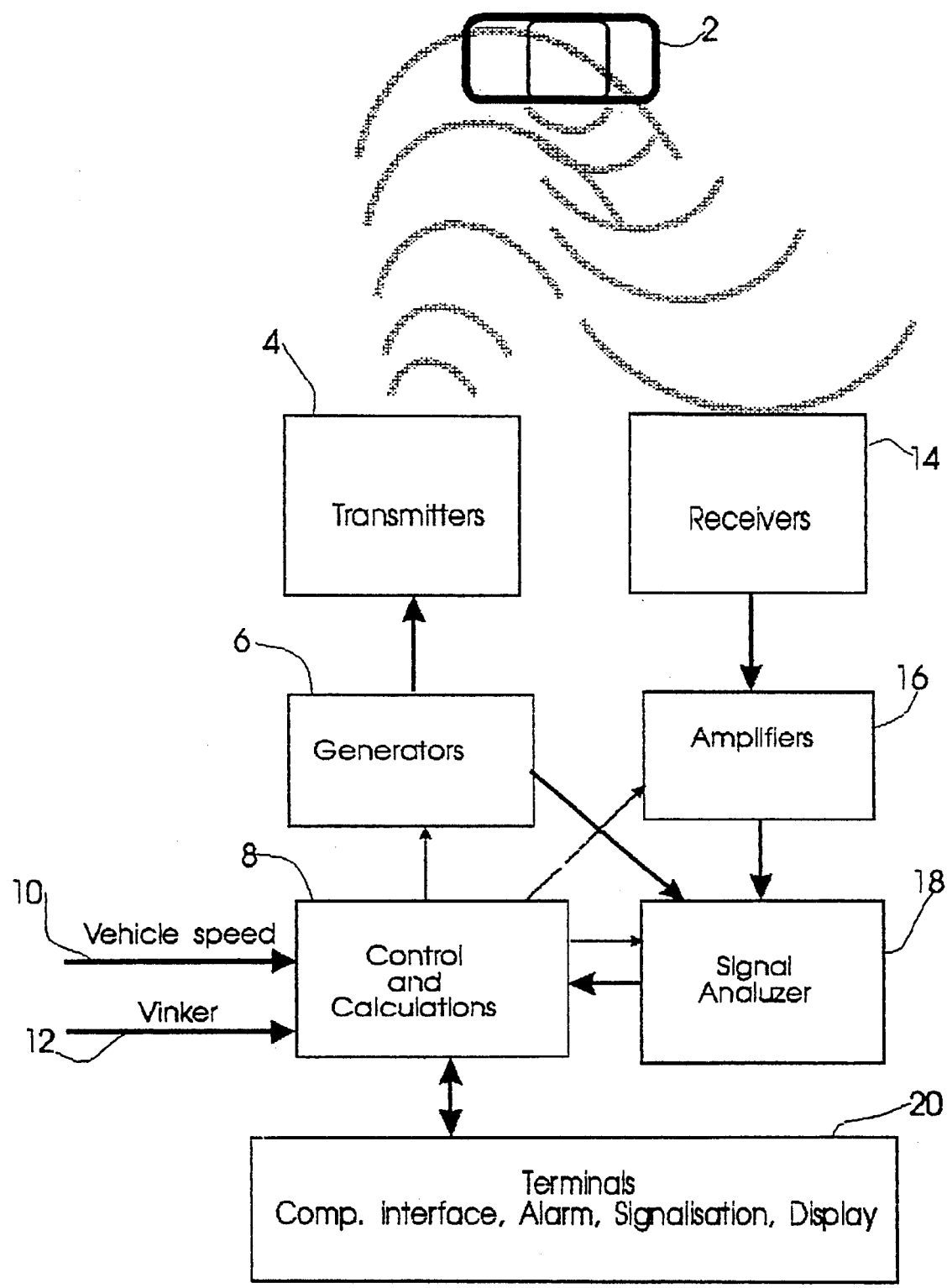
FIG. 3 presents a basic embodiment of the apparatus, according to the present invention which includes: radiation sources (4), radiation receivers (14), amplifiers (16), signal analyzer (18), control and calculation unit (8) with conditions inputs mm signal (12) and vehicle state of moving (10), terminals (20) like computer interface, alarm and/or signalization.

An object of the present invention is to provide appropriate solutions for detection of a vehicle appeared in the dead field of drivers view or in every place in the right or left side and in questionable areas back of them. Proposed problem solution based on ultrasound location of the dangerous area R and L defined on FIGS. 1 and 2. The ultrasound waves emitted from transmitters 4 to the dangerous area are reflected back from the overtake or moving parallel vehicle 2 and receiver 14. Ultrasound signals are emitted by transmitters, for, may be individualize continuous or pulsed or modulated for each individual vehicle, and thereby preventing interference between ultrasound vehicle detection signals emitted and received by adjacent vehicles. Amplified by amplifiers 16 signal goes to signal analyzer 18 may be either an analog or digital analyzer for place determination of place and speed of vehicle in this area. Control and calculation unit 8 takes into account a number of useful signals like its own speed and state of turn signal. The proposed system is preferably activated if two conditions are presented: vehicle moves (speed signal 10) and driver intends to change lane left and right (ram signal 12), but may also be activated continuously without regard to the turn signal 12 being activated. When the vehicle is stationary it may be desirable to increase the zone of hazard in order to take into account the greater differential speed between the stationary vehicle and the nearby moving vehicles. In the terminals set computer interface is available for communication with more complete and complicated systems of vehicle electronics. Other terminals are different systems of alarming and signalization. A non wire communication channel may be provided between the control and calculations unit and the alarm or display unit.

In a preferred embodiment, the apparatus activates if only two conditions are present: speed of vehicle is not equal to zero—vehicle moves: turn signal is turned on indicating that the driver intends to move left or right.

There is a difference among distances A and B. An object in areas R and L into the region A is always dangerous. Vehicle in region B is dangerous only if distance among the two vehicles decreases. An apparatus actions defined for those two regions is different.

For regions L and R on distance A alarm or signalization will be activated only if an overcoming vehicle will be detected in those areas.

For regions L and R on distance B alarm or signalization will be activated in case when the speed of the detected vehicle is more than the detector's carrier speed. The negative or positive difference of speed can be defined by use of Doppler Effect.

Transmitters and receivers may be installed on the external left and/or right side of the vehicle, or on the rearview mirror, or on the external top part of the vehicle. While the invention has been described with respect to a limited number of embodiments, it will be appreciated that many variations, modifications and other applications of the invention may be made.

What is claimed is:

1. An apparatus for the automatic detection of dangerous objects in the left and right sides of vehicle and in its back space comprising:

(a) generators, capable of generating individualized signals;

(b) ultrasound transmitters activated by generators for emitting a continuously or pulsed or modulated ultrasound signal with defined angle of radiation;

(c) ultrasound receivers for receiving a signal depending on the road situation connected to an analog or digital analyzer for determination of intensity, speed of change, Doppler's frequency change and angle of fall of said received signal that depends on road situation;

(d) amplifiers, for amplifying said received signal depending on road situation;

(e) signal analyzer includes time and frequency discriminators for speed and distance determination, received returned signal from amplifiers and standard signal from generator;

(f) control and calculation unit with condition inputs including vehicle speed and turn signal;

(g) communication terminals, including alarm or display unit for communication with a driver, said alarm or display unit providing alarm or signalization to said driver in the event of the dangerous objects presence in a predefined area, wherein said pre-defined area is a first area that is limited by lines of said driver's direct view, a second area of the borders of left and right adjacent lines of traffic and a third area of a predetermined distance back from the vehicle, said predefined area including dead area open space defined by angles $\beta 1$ and $\beta 2$;

(h) individualizing of continuous or pulsed or modulated ultrasound signals for each individual vehicle blind spot detector, thereby preventing interference between ultrasound vehicle detection signals emitted and received by adjacent vehicles.

2. An apparatus according to claim 1 wherein said emitted and received signal includes a sound or ultrasound signal.

3. An apparatus according to claim 1, wherein said ultrasound transmitters and receivers are installed on the external left and/or right side of the vehicle which has rear-view mirrors, adjacent to said rear-view mirrors.

4. An apparatus according to claim 1 wherein said ultrasound transmitters and receivers are installed on the external top part of the vehicle.

5. An apparatus according to claim 1 further comprising a non wire communication channel between said control and calculations unit and said alarm or display unit.

6. An apparatus according to claim 1, wherein said communications terminals further include a computer interface for communication with more complete and complicated systems of vehicle electronics.

* * * * *